June 10, 1958   G. J. BOHRER   2,838,428
PLASTICIZED VINYL HALIDE RESINS AND ELECTRICAL
CONDUCTORS INSULATED THEREWITH
Filed May 28, 1949
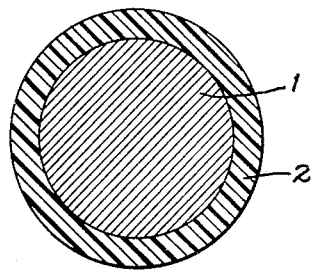
Inventor
George J. Bohrer,
by [signature]
Their Attorney.

2,838,428

PLASTICIZED VINYL HALIDE RESINS AND ELECTRICAL CONDUCTORS INSULATED THEREWITH

George J. Bohrer, Troy, N. Y., assignor to General Electric Company, a corporation of New York Application May 28, 1949, Serial No. 95,974

7 Claims. (Cl. 117—232)

This invention relates to plasticized vinyl resins. More particularly, the present invention is concerned with vinyl halide resins plasticized with a composition of matter comprising the liquid product of reaction of a mixture of ingredients comprising (1) a saturated aliphatic dihydric alcohol containing at least three carbon atoms, (2) a saturated aliphatic dicarboxylic acid and (3) a monocarboxylic acid selected from the class consisting of saturated aliphatic acids containing from 8 to 16 carbon atoms, vegetable oil acids, animal oil acids, rosin acids, tall oil acids, and mixtures thereof, the said monocarboxylic acid acting as an esterifying chain stopper at each end of the linear ester chain formed by the reaction between the aforesaid dihydric alcohol and dicarboxylic acid. The various plasticizers and methods for preparing the same employed in the practice of the instant claimed invention are more particularly disclosed and claimed in the copending application, Serial No. 96,163, now abandoned, George J. Bohrer, filed concurrently herewith and assigned to the same assignee as the present invention.

Many plasticizers have been employed for plasticizing vinyl halide resins. In almost every case it has been necessary to use a specific plasticizer if it is desired to obtain a particular property in the plasticized material. Thus, whereas one plasticizer might improve the low temperature flexibility of the vinyl halide resin, such plasticizer might well be too volatile at elevated temperatures when incorporated in the vinyl halide resin. Moreover, whereas some plasticizers might have good light and weather resistance, the same plasticizer might be deficient in either its oil resistance or its compatibility with the vinyl halide resin.

I have now discovered that a certain class of chain-stopped linear, permanently fusible liquid polyesters, more particularly described above, have eminent suitability as plasticizers for vinyl halide resins and these linear chain-stopped polyesters incorporate to the greatest known degree all the average, more desirable properties found individually in other plasticizers. Unexpectedly, I have discovered that this particular class of plasticizers when incorporated in a vinyl halide resin by suitable means imparts to such resin outstanding flexibility, good low temperature flexibility, light resistance and weather resistance, as well as outstanding oil resistance, and, in addition, the plasticized vinyl halide resin exhibits an extraordinarily low volatility at elevated temperatures and possesses a limited mobility and migration of the plasticizer within the polymeric structure of the vinyl halide resin. The use of such plasticizers is unexpectedly enhanced by the fact that these plasticizers are liquid and of sufficiently low viscosity to permit easy handling, can be manufactured easily and economically, and impart to the vinyl halide resin an attractive feel or "hand."

The vinyl halide resins for which the chain-stopped linear polyesters claimed in the aforementioned Bohrer application, Serial No. 96,163, are eminently suitable as plasticizers comprise the product of polymerization of a mass containing a vinyl halide, especially a predominant proportion of the vinyl halide. Among such compositions are (1) the polyvinyl halides, such as, for example, polyvinyl chloride (including the different molecular weight forms, e. g., gamma-polyvinyl chloride, etc.), polyvinyl bromide, etc.; (2) vinyl resins produced by the conjoint polymerization of a vinyl halide, e. g., vinyl chloride, and a vinyl ester of a lower saturated aliphatic monocarboxylic acid, for instance, vinyl acetate (such vinyl chloride-vinyl acetate copolymers being available under the trade name of Vinylite resins wherein the vinyl chloride component is present in a preponderant amount), vinyl propionate, vinyl butyrate, vinyl hexoate, vinyl acetobutyrate, vinyl chloroacetate, vinyl chloropropionate, etc., it being understood from the foregoing examples that the term "lower saturated aliphatic monocarboxylic acid" embraces ones containing at most six carbon atoms; (3) vinyl resins produced by the conjoint polymerization of a vinyl halide and an acrylic compound, e. g., the copolymers of vinyl chloride with, for example, ethyl methacrylate, methyl methacrylate, benzyl or chlorobenzyl acrylate, methyl chloroacrylate, etc.; (4) copolymers of a vinyl halide, e. g., vinyl chloride, and a vinylidene halide, e. g., vinylidene chloride; and (5) many other vinyl resin copolymers, such as the copolymers of three-component systems, for example, vinyl chloride, vinyl acetate and ethyl methacrylate, etc. As will be understood by those skilled in the art, other multi-component copolymers may be used, the only requirement being that at least one of the components is a vinyl halide. Further methods of preparation of the vinyl halide resins employed herein and additional examples of vinyl halide copolymers which may be plasticized with the aforementioned chain-stopped linear polyesters may be found in e. g., D'Alelio Patents 2,378,753, issued June 19, 1945, and 2,299,740, issued October 27, 1942, both of which are assigned to the same assignee as the present invention.

As pointed out previously, the chain-stopped linear, permanently fusible liquid polyesters formed as a result of reacting a mixture of ingredients comprising (1) a saturated aliphatic dihydric alcohol containing at least three carbon atoms, (2) a saturated aliphatic dicarboxylic acid and (3) a monocarboxylic acid selected from the class consisting of saturated aliphatic acids, vegetable oil acids, animal oil acids, rosin acids, tall oil acids, and mixtures thereof, are more particularly disclosed and claimed in the aforementioned Bohrer application, Serial No. 96,163, which application by reference is made a part of this application. Examples of chain-stopping saturated aliphatic monocarboxylic acids which may be used in addition to those mentioned above are, for instance, hexanoic, 2-ethylhexanoic, lauric, myristic, stearic, palmitic, etc., acids. On a molar basis, we may use for each mol of the dicarboxylic acid at least two mols of the dihydric alcohol, and two mols of the monocarboxylic acid sufficient to effect the chain-stopping of the linear polyester. For many applications I prefer as plasticizers for the aforementioned vinyl halide resins compositions resulting from the reaction of a mixture of ingredients comprising (1) a saturated aliphatic dihydric alcohol containing from 3 to 6 carbon atoms, specifically, propylene glycol and dipropylene glycol, (2) a saturated aliphatic dicarboxylic acid containing from 4 to 10 carbon atoms, specifically, adipic and azelaic acids, and (3) fatty oil acids of the class described above containing an average of from 6 to 20, for instance, from 8 to 16 carbon atoms. Examples of chain-stopping saturated aliphatic monocarboxylic acids which may be used in preparing the claimed compositions of matter, in addition to the vegetable oil acids, animal oil acids, rosin acids and the tall oil acids mentioned previously may be mentioned, for instance, hexanoic, 2-ethylhexanoic, lauric, myristic, stearic, palmitic, etc., acids. Optimum results are obtained when using saturated aliphatic monocarboxylic acids, i. e., fatty oil acids, containing from 6 to 20 carbon atoms, preferably from 8 to 16 carbon atoms.

Additional examples of chain stopping terminal monocarboxylic acids, i. e., fatty oil acids, which may be employed are various animal oil acids, as, for example, sperm whale oil acids (which for the most part comprise a mixture of lauric, palmitic, and myristic acids), etc. Further examples of vegetable oil acids which may be used are, for example, coconut oil acids, linseed oil acids, cottonseed oil acids, corn oil acids, rosin acids, chinawood oil acids, etc. The longer chain monocarboxylic acids tend to improve the compatibility of the plasticizer with the vinyl halide resin. By a proper choice of reactants in making the plasticizer, it is possible to tailor a particular plasticizer for a certain application, taking into account the ultimate use to which the plasticized vinyl halide resin is intended to be put.

In preparing the chain-stopped plasticizers employed in the practice of the present invention, the reactants, for instance, the propylene glycol, adipic acid, and chain-stopping fatty oil acid containing from 8 to 20 carbon atoms are charged to a reaction vessel equipped with stirring and heating means. Thereafter, the mixture is heated at elevated temperatures, for example, from about 125° to 250° C. for a period of from about 2 to 15 hours or more while at the same time removing the water of esterification formed during the process. The heating is preferably conducted in such a manner so as to affect an incremental increase in the temperature of the reaction mass during the period of the reaction with a concurrent decrease in the acid number. If desired, the reaction may be conducted in the presence of selected solvents which are inert to the reactants or the reaction product.

Generally the proportions of ingredients may be varied within wide limits depending on the size of the molecule desired in the chain-stopped polyester employed as plasticizer. Thus, on a molar basis, there may be employed for each mol of the dicarboxylic acid, that is, the adipic or azelaic acid, at least two mols of the dihydric alcohol, that is, the propylene glycol and dipropylene glycol, and about two mols of the monocarboxylic acid or fatty oil acid sufficient to effect the chain-stopping of the linear polyester. These polyesters employed as plasticizers differ from the so-called "alkyd resins" which have been known heretofore in that they comprise a mixture of average molecular polymer structures whose individual lengths are more uniform than the alkyd resin which comprise a variety of molecular weight fractions, including, in many instances, low molecular weight cyclic structures.

In preparing the chain-stopped polyester, if suitable molar equivalents of the ingredients are present in the reaction mixture, continued heating at elevated temperatures will cause the acid value of the final reaction product to be lower. In many applications, especially in the plasticizing applications for which these materials are employed in the practice of the present invention, higher acid values can be tolerated satisfactorily. However, where it is important to maintain optimum electrical properties, it has been found eminently desirable and in many cases necessary to bring the acid value of the final reaction product to below 5, for example, from 0.1 to 3.

These chain-stopped polyesters can be tailored to any desired molecular weight or linearity depending on the molar proportions and on the ingredients used in the reaction mixture. For most applications, on a molar basis, it is preferable to use from about 4 to 10 mols of the dicarboxylic acid in the reaction mixture. The amount of the dihydric alcohol employed in such instances is generally equal to $n+1+x$ mols thereof where $n$ is equal to the number of mols of the dicarboxylic acid and $x$ is equal to at least a slight molar excess, for example, from about 0.1 to 2.0 or more molar excess, e. g., to 4 or 6 mols, of the dihydric alcohol, necessary to cause the reaction to go to completion.

The chain-stopping monocarboxylic acid is preferably present in a proportion of at least 2 mols, excess amounts remaining unreacted and requiring later removal in isolation and purification of the chain-stopped reaction products.

For optimum compatibility and volatility, it is desirable to maintain the viscosity of the plasticizer within the range of from about 250 to 4,000 centipoises at 25° C. In all cases the actual viscosity will depend upon the ingredients or reactants used, the molar ratio of the dicarboxylic acid to the dihydric alcohol, and the degree of condensation between these two reactants as evidenced by the lowering of the acid value.

In order that those skilled in the art may better understand how the present invention may be practiced, the following examples are given by way of illustration and not by way of limitation. All parts are by weight.

EXAMPLE 1

In this example a chain-stopped linear, permanently fusible liquid polyester was prepared by charging the following reactants to a reaction kettle equipped with a stirrer and heating means.

|  | Parts | Molar Ratio |
|---|---|---|
| Adipic acid | 364 | 3.0 |
| Propylene Glycol | 280 | 4.4 |
| Coconut oil fatty acids | 356 | 2.0 |

The above mixture was heated under a nitrogen atmosphere to a temperature of from 150° to 160° C. for about 2 hours, the temperature raised from 170° to 180° C. for 1 hour, then to 200° to 210° C. for 4 to 5 hours, and finally raised slowly to 225° to 235° C. for 4 to 5 hours. During the reaction the water of esterification was removed by distillation from the reacting mass. Any remaining unreacted ingredients were removed from the reaction mass under reduced pressure to leave a liquid, permanently fusible, chain-stopped product having the following properties:

Specific gravity at 27° C _____ 1.023
Viscosity at 27° C _____cps__ 275
Acid value _____ 7.5

The above liquid plasticizer was mixed with the following ingredients in the stated proportions:

Ingredients: Parts
    Copolymer of 98 percent vinyl chloride and 2 percent vinyl acetate _____ 60
    Chain-stopped linear polyester plasticizer _____ 40
    PbO (stabilizer) _____ 5

The above ingredients were milled together for about 10 minutes on heated differential rolls until a homogeneous mixture of the materials was obtained. As a control, other samples of plasticized vinyl chloride-vinyl acetate copolymers were prepared using in place of the chain-stopped linear liquid polyester described above other well-known plasticizers, such as, for example, tricresyl phosphate, dioctyl phthalate, dibenzyl sebacate, and a Paraplex plasticizer (non-chain-stopped resinous reaction product of a dicarboxylic acid and a dihydric alcohol). Each of the plasticized materials was pressed into the form of flat sheets which were then subjected to various tests with the following results.

| Plasticizer | Cold Temperature Flexibility, °C. | Heat Aging | |
|---|---|---|---|
| | | 3 Days at 150° C. | 5 Days at 125° C. |
| Chain-stopped linear liquid polyester described above. | −20 | Very flexible. | 10% decrease in elongation. |
| Tricresyl phosphate | −8 | Brittle | 35% decrease in elongation. |
| Dioctyl phthalate | −38 | do | 76% decrease in elongation. |
| Dibenzyl sebacate | −39 | do | 35% decrease in elongation. |
| Paraplex [1] plasticizer (G-25) | −10 | do | 25-50% decrease in elongation. |
| Dioctyl sebacate | −55 | do | 35% decrease in elongation. |

[1] Manufactured by Resinous Products and Chemical Company of Philadelphia, Pennsylvania.

Difficulty was encountered in plasticizing the vinyl chloride-vinyl acetate resin with the usual non-chain-stopped polyester resinous plasticizer because of a certain degree of incompatibility (as evidenced by the appearance of "fish eyes" on the surface of the plasticized material) between the materials. Comparison of the tensile strength of the vinyl chloride copolymer plasticized with the aforementioned chain-stopped linear polyester with the same resin plasticized with dioctyl sebacate shows that the former had a tensile of approximately 2,000 p. s. i. whereas the latter had a tensile of 1,200 p. s. i.

I have discovered unexpectedly that, contrary to the belief heretofore that stabilizers of vinyl halide resins were specific to the latter, consideration should also be given to the type of plasticizer used in connection with a specific stabilizer for the vinyl halide resin. More particularly, I have found that even though the percent of stabilizer is relatively small in the plasticized vinyl halide resin, nevertheless, the specific type of stabilizer employed has a marked effect on the properties of the plasticized vinyl halide resin. In the following example it will be apparent from a comparison of the properties of the plasticized composition containing the tribasic lead salt used ($3PbO \cdot PbSO_4 \cdot H_2O$) with the properties of the plasticized vinyl halide resin containing litharge (PbO) as a stabilizer, that there are marked differences obtainable with each stabilizer.

EXAMPLE 2

In this example the following two formulations were compounded on rubber compounding rolls in the same manner as was employed in Example 1.

| Ingredients | Sample A | Sample B |
|---|---|---|
| | Parts | Parts |
| Copolymer of 98% vinyl chloride and 2% vinyl acetate | 60 | 60 |
| Plasticizer used in Example 1 | 40 | 40 |
| PbO (stabilizer) | 5 | |
| 3PbO·PbSO₄·H₂O (stabilizer) | | 5 |

Tests conducted on sheets molded from the foregoing two sample compositions showed the following results:

| | Sample A | Sample B |
|---|---|---|
| Tensile, p. s. i | 2,270 | 2,660 |
| Percent elongation | 240 | 385 |
| Aged 5 days at 121° C.: | | |
| Percent tensile change | +16 | +5 |
| Percent elongation change | −12 | 0 |
| Low temperature flexibility, ° C | −25 | −32 |

EXAMPLE 3

In this example the following formulation using the tribasic lead salt employed in Example 2 was molded on rubber compounding rolls in the same manner as in Example 1 and sheets therefrom pressed and tested with the following results:

Formulation

| | |
|---|---|
| Copolymer of 98% vinyl chloride and 2% vinyl acetate | 60 |
| Plasticizer described in Example 1 | 40 |
| 3 PbO·PbSO₄·H₂O (stabilizer) | 5 |

Test results

| | |
|---|---|
| Tensile p. s. i | 2420 |
| Percent elongation | 350 |

These test results when compared with plasticized material described in Example 1 showed that the use of the tribasic lead salt as a stabilizer in place of litharge (PbO) gave an increase in the tensile strength and in addition improved markedly the percent elongation of the plasticized material. Moreover, it was also found that the change in tensile and elongation after heat aging was also smaller than when litharge was employed as the stabilizer.

EXAMPLE 4

To show the effect of using relatively small amounts of the plasticizers disclosed and claimed in the aforementioned Bohrer application on commonly used plasticizers, particularly tricresyl phosphate, the following formulations were prepared:

| Ingredients | Sample A | Sample B |
|---|---|---|
| | Parts | Parts |
| Polyvinyl chloride | 60 | 60 |
| Plasticizer employed in Example 1 | | 10 |
| Tricresyl phosphate | 40 | 30 |
| PbO (stabilizer) | 5 | 5 |

Each of the samples was molded as in Example 1, pressed into sheets and tested with the following results:

| | Sample A | Sample B |
|---|---|---|
| Tensile, p. s. i | 2,946 | 2,930 |
| Percent elongation | 257 | 285 |
| Low temperature flexibility, ° C | −8 | −14 |

One of the characteristics inherent in vinyl halide resins plasticized with the aforementioned chain-stopped polyester is the fact that they are essentially inert with regard to attacking other plastic materials. Thus, in certain applications where plasticized vinyl halide resins are employed for insulating electrical conductors, great difficulty has been encountered when such insulated conductors have been brought into contact with plastic surfaces to which the conductor is attached. A specific instance involves an electric clock containing molded plastic, particularly molded polystyrene housings. It was found that electric cords plasticized with the usual plasticizers tended to attack the polystyrene. This difficulty was completely obviated when the chain-stopped linear polyesters were employed for plasticizing the vinyl halide resin.

One of the unexpected and unusual features of the use of the chain-stopped linear polyester resides in the fact that the low temperature flexibility can be materially improved by employing certain types of finely divided fillers such as, for instance, finely divided calcined clay (Whitex No. 2 manufactured by the Southern Clay Company). This unexpected discovery was peculiar to the chain-stopped linear polyester when used as plasticizers and had no effect on any of the properties when used with other well-known plasticizers.

Exposure to weather elements of vinyl halide resins plasticized with the chain-stopped linear polyesters shows that after eight months there is no checking or darkening of the plasticized material. Controls with tricresyl phosphate or dioctyl phthalate as plasticizers on the other hand, after the same length of time, showed chalking, checking and darkening to a greater degree.

It will, of course, be apparent to those skilled in the art that other vinyl halide resins, as well as other chain-stopped liquid linear polyesters, many examples of which have been given in the aforementioned Bohrer application, may be employed in place of the vinyl halide resin and liquid chain-stopped polyesters used above without departing from the scope of the invention. Thus, I may use unmodified polyvinyl chloride, or other copolymers of vinyl halide monomers such as, for instance, a copolymer of vinyl chloride and vinyl propionate, etc. Additional examples of chain-stopped linear liquid polyesters which may be employed are, for example, the product of reaction of adipic acid, dipropylene glycol, and coconut oil fatty acids, the reaction product of propylene glycol, adipic acid and tall oil, the reaction product of propylene glycol, adipic acid and lauric acid, the reaction product of propylene glycol, sebacic acid and coconut oil fatty acids, etc.

It will also be apparent to those skilled in the art that other methods of compounding and incorporating the plasticizer may be used as, for instance, spraying the plasticizer into finely divided particles of the vinyl halide resin, etc. The amount of plasticizer used in each case may be varied at will and within wide limits and I do not intend to be limited to any particular range since the properties of the plasticized vinyl halide resin are dependent to a large extent on the amount of plasticizer incorporated. In many applications I have found it advantageous to use from 10 to 70 percent of the plasticizer based on the total weight of the vinyl halide resin and the plasticizer. Preferably, I may use from 25 to 60 percent of the plasticizer, based on the total weight of the latter and the vinyl halide resin.

In addition, other heat stabilizers than the lead oxide or tribasic lead sulfate used in the foregoing example may also be employed as, for instance, lead silicate, lead carbonate, lead trimethylsilanolate, etc. The stabilizer is preferably present in an amount equal to from about 0.5 to 10 or 15 percent, by weight, based on the weight of the vinyl halide resin. Although amounts in excess of 15 percent may be employed, for economical reasons smaller amounts are preferred.

In the compounding of the plastic compositions for various uses, there may be included various fillers, such as titanium dioxide, lithopone, etc., as well as other common plasticizers such as, for example, dioctyl phthalate, tricresyl phosphate, etc., pigments and other modifying materials, without detrimental effect upon the heat, light and electrical stability of the plasticizing materials. For optimum electrical properties, it is highly desirable that the acid value of the chain-stopped linear polyester be below 5, for instance, from 0.1 to 2.

The foregoing chain-stopped linear polyesters may be used to plasticize other halogen-containing resinous and rubber-like products, for instance, polyvinylidene products and copolymers thereof (e. g., polyvinylidene chloride and copolymers thereof, neoprene, chlorinated paraffin wax, chlorinated rubber, etc.). These same plasticizers have been used successfully to plasticize blends of a polyvinyl halide resin (e. g., polyvinyl chloride or a copolymer of vinyl chloride and vinyl acetate) with a copolymer of butadiene and acrylonitrile (Buna–N).

In addition to being capable of effectively plasticizing vinyl halide resins, it has also been discovered that the linear chain-stopped, liquid polyester plasticizers described in the aforementioned Bohrer application, Serial No. 96,163, are also eminently suitable as plasticizers for natural rubbers and such synthetic rubbers as, for example, copolymers comprising the product of copolymerization of a mass containing butadiene and styrene, or butadiene and acrylonitrile, or butadiene and a monoolefin, for example, a small amount of a monoolefin such as isobutylene; a copolymer of butadiene, styrene, and ethyl acrylate, etc.

In one test a copolymer of butadiene and acrylonitrile (identified as Hycar OR–25 EP) was mixed with the following ingredients in the stipulated parts by weight:

| Ingredients: | Parts |
| --- | --- |
| Butadiene-acrylonitrile copolymer | 100.0 |
| Zinc oxide | 5.0 |
| Stearic acid | 1.0 |
| Sulfur | 1.5 |
| Carbon black | 60.0 |
| Benzothiazyl disulfide | 1.5 |
| Liquid plasticizer employed in Example 1 | 30.0 |

All the foregoing ingredients were compounded and mixed together on heated rubber compounding rolls until a homogeneous rubbery sheet was obtained. The latter was molded for 30 minutes at 310° F. in the form of a sheet and thereafter tested with the following results:

| | |
| --- | --- |
| Modulus at 300 percent | 1550 |
| Tensile strength p. s. i. | 2400 |
| Elongation percent | 600 |
| Low temperature flexibility, ° F. | –50 |

When dibutyl phthalate, which is often employed as a plasticizer for similar rubbers, was substituted in place of the linear, liquid, chain-stopped polyester employed above as a plasticizer for the butadiene-acrylonitrile polymer, the following results were obtained under equivalent molding conditions:

| | |
| --- | --- |
| Modulus at 300 percent | 900 |
| Tensile strength p. s. i. | 2200 |
| Elongation percent | 530 |
| Low temperature flexibility, ° F. | –50 |

The claimed plasticized compositions can be used for making shower curtains, table cloths, rain coats, etc. They are eminently suitable for insulating electrical conductors as, for instance, copper conductors, etc. Copper cores insulated with the claimed plasticized compositions, for instance, with the plasticizer found in Example 1, are extremely heat-stable and exhibit good electrical characteristics, especially when the acid value of the plasticizer is below 2. The accompanying drawing shows an insulated conductor comprising a metallic core 1 and an outer insulation 2 comprising a vinyl halide resin plasticized with the liquid compositions disclosed and claimed in the aforementioned Bohrer application.

What I claim as new and desire to secure by Letters Patent of the United States is:

1. A composition of matter comprising, by weight (1) from 40 to 75 percent polyvinyl chloride and (2) from 25 to 60 percent of a plasticizer for (1) having an acid value below 5 and comprising an acid chain-stopped, liquid, heat-stable permanently fusible composition comprising the product of reaction under heat of a mixture of ingredients in the unreacted state and in the following molar ratio and consisting essentially of (a) from 4 to 10 mols of adipic acid, (b) $n+1+x$ mols propylene glycol where $n$ is equal to the number of mols of adipic acid, and $x$ is equal to a slight molar excess of the propylene glycol necessary to effect complete esterification, and (c) about 2 mols of coconut oil fatty acids, the latter fatty acids acting as esterifying chain-stoppers at each end of the linear ester chain formed by the reaction of the aforesaid propylene glycol and adipic acid.

2. A composition of matter comprising by weight (1) from 40 to 75 percent of a vinyl halide resin comprising the product of conjoint polymerization of a mass containing a predominant proportion of vinyl chloride and a minor proportion of vinyl acetate and (2) from 25 to 60 percent of a plasticizer for (1) having an acid value below 5 and comprising an acid chain-stopped, liquid, heat-stable, permanently fusible composition comprising the product of reaction under heat of a mixture of ingredients in the unreacted state and in the following molar ratio and consisting essentially of (a) from 4 to 10 mols of adipic acid, (b) $n+1+x$ mols propylene glycol where $n$ is equal to the number of mols of adipic acid, and $x$ is equal to a slight molar excess of propylene glycol necessary to effect complete esterification, and (c) about 2 mols of coconut oil fatty acids, the latter fatty acids acting as esterifying chain-stoppers at each end of the linear ester chain formed by the reaction of the aforesaid propylene glycol and adipic acid.

3. A composition of matter comprising (1) polyvinyl chloride, (2) a plasticizer for (1) comprising an acid chain-stopped, liquid-heat-stable permanently fusible composition comprising the product of reaction under heat of a mixture of ingredients in the unreacted state and in the following molar ratio and consisting essentially of (a) from 4 to 10 mols adipic acid, (b) $n+1+x$ mols propylene glycol where $n$ is equal to the number of mols of adipic acid, and $x$ is equal to a slight molar excess of the propylene glycol necessary to effect complete esterification, and (c) about 2 mols of coconut oil fatty acids, the latter fatty acids acting as esterifying chain-stoppers at each end of the linear chain formed by the reaction of the aforesaid propylene glycol and adipic acid.

4. A composition of matter comprising (1) a vinyl halide resin comprising the product of conjoint polymerization of a mass containing a predominate proportion of vinyl chloride and a minor proportion of vinyl acetate, (2) a plasticizer for (1) comprising an acid chain-stopped, liquid, heat-stable, permanently fusible composition comprising the product of reaction under heat of a mixture of ingredients in the unreacted state and in the following molar ratio and consisting essentially of (a) from 4 to 10 mols adipic acid (b) $n+1+x$ mols propylene glycol where $n$ is equal to the number of mols of adipic acid, and $x$ is equal to a slight molar excess of the propylene glycol necessary to effect complete esterification, and (c) about 2 mols of coconut oil fatty acids, the latter fatty acids acting as esterifying chain-stoppers at each end of the linear ester chain formed by the reaction of the aforesaid propylene glycol and adipic acid.

5. A composition of matter comprising (1) a vinyl halide resin selected from the class consisting of polyvinyl chloride and copolymers of vinyl chloride and vinyl acetate in which the vinyl chloride comprises a predominant proportion of the total weight of the vinyl chloride and vinyl acetate, and (2) a plasticizer for (1) comprising an acid chain-stopped, liquid, heat-stable, permanently fusible composition comprising the product of reaction under heat of a mixture of ingredients in the unreacted state and in the following molar ratio and consisting essentially of (a) from 4 to 10 mols of adipic acid, (b) $n+1+x$ mols of propylene glycol, where $n$ is equal to the number of mols of adipic acid in (a), and $x$ is equal to a slight molar excess of the propylene glycol necessary to effect complete esterification, and (c) about 2 mols of an ingredient comprising a fatty oil acid containing from 6 to 20 carbon atoms, the said ingredient acting as an esterifying chain-stopper at each end of the linear ester chain formed by the reaction of the aforementioned propylene glycol and adipic acid.

6. An insulated electrical conductor comprising (1) an electrically conducting metallic core and (2) insulation for (1) comprising a vinyl halide resin selected from the class consisting of polyvinyl chloride and copolymers of vinyl chloride and vinyl acetate in which the vinyl chloride comprises a predominant proportion of the total weight of the vinyl chloride and vinyl acetate, the said vinyl halide resin being plasticized with an acid chain-stopped, liquid, heat-stable, permanently fusible composition comprising the product of reaction under heat of a mixture of ingredients in the unreacted state and in the following molar ratio and consisting essentially of (a) from 4 to 10 mols of adipic acid, (b) $n+1+x$ mols of propylene glycol, where $n$ is equal to the number of mols of adipic acid in (a), and $x$ is equal to a slight molar excess of the propylene glycol necessary to effect complete esterification, and (c) about 2 mols of an ingredient comprising fatty oil acids containing from 6 to 20 carbon atoms, said ingredient acting as an esterifying chain-stopper at each end of the linear ester chain formed by the reaction between the aforementioned propylene glycol and adipic acid.

7. A composition of matter comprising, by weight, (1) from 40 to 75 percent of a vinyl halide resin comprising the product of conjoint polymerization of a mass containing a predominant proportion of vinyl chloride and a minor proportion of vinyl acetate and (2) from 25 to 60 percent of a plasticizer for (1) comprising an acid chain-stopped, liquid, heat-stable, permanently fusible composition comprising product of reaction under heat of a mixture of ingredients in the unreacted state and in the following molar ratio and consisting essentially of (a) from 4 to 10 mols of adipic acid, (b) $n+1+x$ mols propylene glycol, where $n$ is equal to the number of mols of adipic acid, and $x$ is equal to a slight molar excess of propylene glycol necessary to effect complete esterification, and (c) about 2 mols of tall oil fatty acids, the latter fatty acids acting as esterifying chain-stoppers at each end of the linear ester chain formed by the reaction of the aforesaid propylene glycol and adipic acid.

References Cited in the file of this patent

UNITED STATES PATENTS

| | | |
|---|---|---|
| 2,089,181 | Bradley | Aug. 10, 1937 |
| 2,089,196 | Ellis | Aug. 10, 1937 |
| 2,106,703 | Cox et al. | Feb. 1, 1938 |
| 2,141,126 | Doolittle | Dec. 20, 1938 |
| 2,191,056 | Wick | Feb. 20, 1940 |
| 2,407,479 | D'Alelio | Sept. 10, 1946 |
| 2,483,726 | Floyd | Oct. 4, 1949 |
| 2,512,723 | Lanham | June 27, 1950 |
| 2,606,162 | Coffey | Aug. 5, 1952 |

FOREIGN PATENTS

| | | |
|---|---|---|
| 586,826 | Great Britain | Apr. 1, 1948 |
| 610,138 | Great Britain | Oct. 12, 1948 |
| 237,401 | Switzerland | Jan. 16, 1946 |